Oct. 1, 1935.  F. E. WOLCOTT  2,015,983

COFFEE MAKER

Filed Feb. 5, 1935

INVENTOR:
FRANK E. WOLCOTT
BY
ATTORNEY.

Patented Oct. 1, 1935

2,015,983

UNITED STATES PATENT OFFICE 2,015,983

COFFEE MAKER

Frank E. Wolcott, West Hartford, Conn., assignor to The Silex Company, a corporation of Connecticut Application February 5, 1935, Serial No. 5,099

14 Claims. (Cl. 53—3)

My invention relates to coffee makers.

It has among its objects the provision of an improved resilient seal of the type adapted to use in connection with glass coffee makers of the vacuum type in which an air-tight seal is required between the neck of a lower bowl and the stem of an upper bowl disposed in said neck during the coffee making operation. Further objects of my invention are to provide an improved seal having an improved axial passage therein cooperating in an improved manner with the external sealing portion and also more easily receiving the tubular stem of the upper bowl. Still further objects of my invention are to provide this improved seal having an improved flexible wall portion out of contact with the stem cooperating with the lower bowl neck in an improved manner to provide an effective seal therein, while also providing a construction wherein the area in contact with the stem is substantially reduced whereby to permit an improved cooperation with the stem. These and other objects and advantages of my improved seal construction will, however, hereinafter more fully appear.

In the accompanying drawing I have shown for purposes of illustration two forms which my invention may assume in practice.

In the drawing:—

Figure 1:
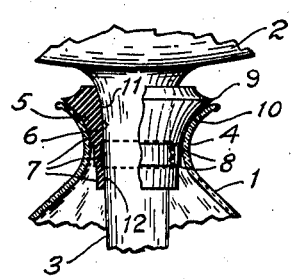
Figure 1 is a side elevation, partly in section, of a coffee maker equipped with my improved seal, the upper and lower bowls being largely broken away.

I have shown my invention applied to a coffee maker comprising a usual lower bowl 1 and upper bowl 2 having a tapered stem 3 extended down into the bell-mouthed neck 4 of the lower bowl, my improved seal being disposed on the stem 3 adjacent the bowl 2 and disposed with said stem in the neck 4.

As in a well-known construction, it will be noted that the seal illustrated in Figs. 1 to 4 comprises a body 5 of yieldable material such as soft live rubber or the like which is capable of yieldingly engaging both the stem 3 and the neck 4 to provide an air-tight seal therebetween. Herein it will be noted that the seal body 5 is provided with an axial aperture 6 therethrough to receive the stem 3 and seal the same, while the external sealing surface of the body 5 is provided with a plurality of stepped surfaces 7 forming longitudinally spaced annular sealing edges 8. It will also be noted that the body 5 adjacent its upper end is provided with an outstanding annular flange terminating in a relatively thin edge 9 and that the sealing surface 10 therebelow, between said flange 9 and the first surface 7, conforms generally to the curve of the bell-mouthed neck 4.

In accordance with the present invention, the surface of the axial passage 6 provides relatively wide sealing bands 11 and 12 engaging and sealing the stem 3 at the upper and lower ends of the seal and an intermediate portion, or groove, 14 of increased diameter providing an intermediate portion 16 of increased flexibility on the seal body due to the annular space 18 between the passage wall and the stem 3 at said groove and the decreased thickness of the resilient seal wall. Here it will be noted that the internal groove 14 is spaced from the ends of the external sealing area on the seal body, which extends from flange 9 to the lowermost stepped surface 7, and that the two annular sealing edges 8 on the external sealing surface lie within the vertical limits of the groove 14 and closely adjacent the upper and lower extremities thereof. The location of the wall portion 16 of increased flexibility inside the sealing edges 8 permits the latter to yield readily to conform to and effectively seal the lower bowl neck 4, the wall portion 16 being free to flex into the space 18 in accordance with the pressure exerted against the sealing edges 8, as clearly illustrated in Figs. 2 and 4.

Figure 3:
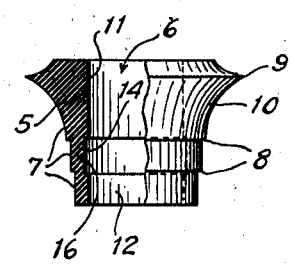
Figure 3 is a full size view of the seal per se shown partly in section.
Figure 5:
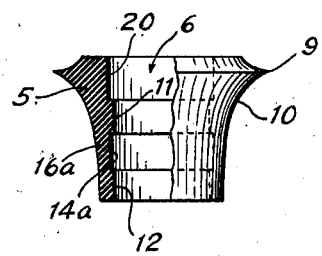
Figure 5 is a view similar to Figure 3 but showing a modified construction.

The modification illustrated in Figure 5 is similar to the construction of Figure 3 except that a smooth exterior sealing surface is provided in conjunction with the internal groove 14a, thus providing greater flexibility in the side wall of the seal at 16a opposite said groove and permitting the external sealing surface to conform more readily to the curved mouth of the bowl, while providing vertically a longer sealing band and greater stability for the upper bowl without the necessity for jamming the seal in the bowl neck. Further, if desired, a portion of the upper sealing band 11 may be cut away at the upper end of the seal body to provide the axial recess 20 in the vicinity of the enlarged upper end of stem 3, enabling the seal to be more easily positioned on and removed from the stem, while still providing upper and lower sealing bands 11 and 12 of ample extent above and below the groove 14.

In the use of my improvement, the seal is first placed on the stem 3, working the same well up on the stem while rotating, or twisting, the seal on the stem. During this operation the presence of the groove 14 in the axial passage 11 reduces considerably the frictional engagement between the seal and the stem, thus enabling the seal more readily to be placed well up on the stem adjacent the bowl 2, while also, of course, permitting easier removal of the seal from the stem for the same reason. The stem of the upper bowl with the seal thereon is then inserted in the neck 4 of the lower bowl sufficiently firmly to effect a sealing engagement between the seal and said neck, a slight twisting motion being used, if necessary, to complete the seal, while a similar twisting of the seal by rotation of the upper bowl in a reverse direction serves to break the seal.

Figure 2:
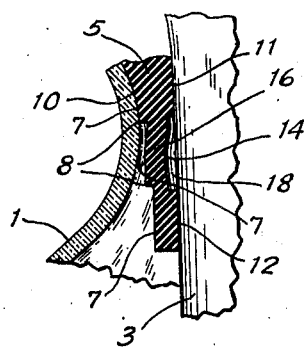
Figure 2 is an enlarged detail of a part of Figure 1.

The seal is adapted to cooperate with bowl necks of varying diameter. As shown in Figures 1 and 2, the seal is illustrated in connection with a lower bowl neck of large diameter in which the concave under portion 10 is seated in the flared mouth of the bowl neck with the uppermost sealing edge 8 engaging the neck, the other sealing edge being free from contact with the neck. As shown most clearly in Figure 2, the sealing edges 8 being disposed within the vertical limits of the internal groove 14, the same, due to the added resiliency of the wall 16 at this point, conform readily to the bowl neck, yielding slightly and resiliently pressing against the neck to form a good seal, without the necessity for jamming the seal into the neck. Thus, in Figure 2 it will be observed that the upper sealing edge 8, as a result of the flexure of the wall portion 16, yieldingly engages the bowl neck, thus permitting the seal to be seated lightly in the neck while still maintaining a good seal therewith.

Figure 4:
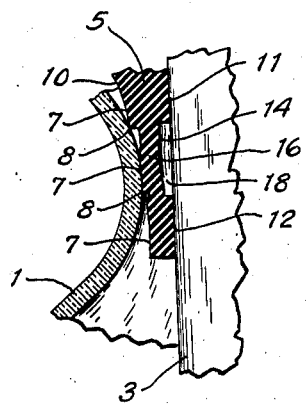
Figure 4 is an enlarged detail view similar to Figure 2 showing the seal in a lower bowl of slightly smaller neck diameter.

In Figure 4, the seal is illustrated in connection with a bowl of slightly smaller neck diameter. Here it will be noted that both sealing edges 8 are in engagement with the bowl neck, the lower sealing edge providing the principal seal while the upper sealing edge engages the neck and steadies the upper bowl while also providing a secondary seal. Here, obviously, the increased flexibility of the seal portion 16 due to the presence of the internal groove 14 inside the sealing edges 8 is especially important.

In the modification illustrated in Figure 5, the seal engages the bowl neck in the same way as above described in connection with Figures 1 through 4. Here it will be noted that, particularly in connection with smaller diameter bowl necks, such as illustrated in Figure 4, the portion of increased flexibility 16a in the vicinity of the internal groove 14a is enabled readily to conform to the curved surface of the lower bowl neck 4, thus providing a wider sealing band while minimizing the necessity for forcing the seal downward into the bowl neck.

As a result of my improved seal construction, it will be noted that the seal is more easily rotated on the stem in forcing the seal into position on the upper enlarged portion of the stem adjacent the bowl due to the decreased area of the axial passage which is in contact with the stem, while also providing a stable seal capable of such rotation while in frictional engagement with the stem with little distortion and capable of supporting the upper bowl unit against tipping. The presence of the annular groove 14 likewise facilitates removal of the seal from the stem for similar reasons. It will also be evident that the presence of the internal groove and the location of the same relative to the external sealing edges, or band of engagement with the lower bowl neck, permits the external sealing surface of the seal to conform more readily to the convex bellmouth of the lower bowl when the same is lightly seated in the neck.

While I have in this application specifically described two forms which my invention may assume in practice, it will be understood that these forms of the same are shown for purposes of illustration and that the invention may be modified and embodied in various other forms without departing from its spirit or the scope of the appended claims.

What I claim as new and desire to secure by Letters Patent is:—

1. A seal for coffee makers or the like comprising a yieldable seal body having an external sealing area and an axial passage adapted to receive and seal a coffee maker bowl stem, the wall of said passage comprising upper and lower sealing bands engaging said stem and an intermediate groove of increased diameter providing a thin flexible wall spaced from said stem and substantially spaced from the opposite ends of said external sealing area.

2. A seal for coffee makers or the like comprising a yieldable seal body having an external sealing surface and having an axial passage adapted to receive and seal a coffee maker bowl stem, said passage having an annular groove of increased diameter intermediate the ends thereof and having wide bands of sealing engagement with said stem above and below said groove.

3. A seal for coffee makers or the like comprising a yieldable seal body having an axial passage adapted to receive and seal a coffee maker bowl stem, the wall of said passage engaging and sealing said stem throughout the greater part of the length of the passage and having an annular portion of increased diameter intermediate the ends of said passage out of contact with said stem.

4. A seal for coffee makers or the like comprising a seal body of resilient material having an external sealing area and an axial passage adapted to receive and seal a coffee maker bowl stem, said passage having a wide sealing portion engaging said stem and having a portion providing a thin flexible wall on said seal body spaced from said stem and between the vertical extremities of said external sealing area.

5. A seal for coffee makers or the like comprising a seal body of resilient material having an axial passage adapted to receive and seal a coffee maker bowl stem, the wall of said passage conforming to and having wide bands of sealing engagement with said stem at the opposite ends of the seal body and having an intermediate portion of increased diameter spaced laterally from said stem.

6. A seal for coffee makers or the like comprising a seal body of resilient material having an external sealing area and having an axial passage adapted to receive and seal a coffee maker bowl stem throughout the greater part of the length of said passage, said passage having intermediate its ends a groove of increased diameter forming a flexible wall portion spaced laterally from said stem, and said external sealing area having an annular sealing edge located on said flexible wall portion.

7. A seal for coffee makers or the like comprising a seal body of resilient material having an external sealing area adapted to engage and seal the neck of a coffee maker lower bowl and having an axial passage adapted to receive and seal the stem of an upper bowl, the wall of said passage having upper and lower wide bands of sealing engagement with the stem and an intermediate groove providing a thin flexible wall portion spaced from said stem, and longitudinally spaced annular sealing edges on said external sealing area located on the opposite side of said flexible wall from said groove.

8. A seal for coffee makers or the like comprising a tubular seal body of resilient material having a relatively thick wall engaging and sealing a coffee maker bowl stem received therein, said wall having an internal groove forming a thin flexible wall portion intermediate the ends of said body.

9. A seal for coffee makers or the like comprising a seal body of resilient material having an external sealing area and having an axial passage adapted to receive and seal a coffee maker bowl stem inserted therein, said seal having a relatively thick wall conforming to said stem at the upper and lower ends of said passage to provide wide bands of sealing engagement with said stem and having an annular groove in said wall providing a thin flexible wall portion of reduced thickness intermediate said bands and spaced from said stem.

10. A seal for coffee makers or the like comprising a seal body of resilient material having an external sealing area and having an axial passage adapted to receive and seal a coffee maker bowl stem inserted therein, said seal body having a relatively thick wall providing wide bands of sealing engagement with the stem at opposite ends of said passage and having an internal annular groove in said wall providing a wall portion of increased flexibility laterally spaced from said stem.

11. A seal for coffee makers or the like comprising a seal body of resilient material having an external sealing area including a plurality of annular sealing edges and having an axial passage adapted to receive and seal a coffee maker bowl stem, the wall of said passage being relatively thick at the upper and lower ends of said seal body and providing relatively wide bands of sealing engagement with said stem and also having an intermediate grooved portion of increased flexibility including the portion of said external sealing area carrying said external sealing edges.

12. A seal for coffee makers or the like comprising a seal body of resilient material having an external sealing area and having an axial passage adapted to receive and seal a coffee maker bowl stem, said passage having a grooved portion intermediate its ends providing a wall portion of increased flexibility, and said external sealing area having vertically spaced annular sealing edges located adjacent the upper and lower limits of said grooved portion.

13. In a coffee maker, a lower bowl having an upstanding neck, an upper bowl having a stem depending into said neck, and a seal disposed on said stem and in said neck having an external sealing area and having an axial passage receiving and sealing said stem throughout the greater part of the length of said passage, said passage having an intermediate portion of increased diameter providing a wall portion of increased flexibility, and said external sealing area having an external stepped surface providing an annular sealing edge disposed within the vertical limits of said wall portion of increased flexibility.

14. In a coffee maker, a lower bowl having an upstanding neck, an upper bowl having a stem depending into said neck, and a seal of resilient material disposed on said stem and in said neck including a wall having wide bands of sealing engagement with said stem at the top and bottom of said seal body and an intermediate wall portion of reduced thickness between said sealing bands.

FRANK E. WOLCOTT.